(12) United States Patent
Harris et al.

(10) Patent No.: US 10,826,042 B2
(45) Date of Patent: Nov. 3, 2020

(54) CURRENT CARRIER FOR VEHICLE ENERGY-STORAGE SYSTEMS

(71) Applicant: Faraday&Future Inc., Gardena, CA (US)

(72) Inventors: W. Porter Harris, Los Angeles, CA (US); Blake Rosengren, Hermosa Beach, CA (US); Nicholas John Sampson, Rancho Palos Verdes, CA (US)

(73) Assignee: Faraday & Future Inc., Gardena, CA (US)

( * ) Notice: Subject to any disclaimer, the term of this patent is extended or adjusted under 35 U.S.C. 154(b) by 749 days.

(21) Appl. No.: 14/938,746

(22) Filed: Nov. 11, 2015

(65) Prior Publication Data

US 2017/0005315 A1   Jan. 5, 2017

Related U.S. Application Data

(63) Continuation-in-part of application No. 14/841,617, filed on Aug. 31, 2015.
(Continued)

(51) Int. Cl.
*H01M 2/20* (2006.01)
*H01M 10/04* (2006.01)
(Continued)

(52) U.S. Cl.
CPC ......... *H01M 2/206* (2013.01); *H01M 2/1077* (2013.01); *H01M 10/425* (2013.01);
(Continued)

(58) Field of Classification Search
CPC ............ H01M 10/425; H01M 10/613; H01M 10/643; H01M 10/6554; H01M 2220/20; H01M 2/1077; H01M 2/206
See application file for complete search history.

(56) References Cited

U.S. PATENT DOCUMENTS

| 5,879,833 A | 3/1999 | Yoshii et al. |
| 8,057,928 B2 | 11/2011 | Kohn et al. |

(Continued)

FOREIGN PATENT DOCUMENTS

| EP | 2270918 | 1/2011 |
| EP | 2482362 | 8/2012 |

(Continued)

OTHER PUBLICATIONS

Written Opinion in International Application No. PCT/US2016/039884, dated Oct. 19, 2016.
(Continued)

*Primary Examiner* — Lingwen R Zeng
(74) *Attorney, Agent, or Firm* — Knobbe Martens Olson & Bear, LLP

(57) ABSTRACT

Provided are current carriers for vehicle energy-storage systems comprising: a positive power plane; a negative power plane; a dielectric isolation layer disposed between the positive power plane and the negative power plane; a plurality of positive contacts formed in the positive power plane, the positive contacts being for electrical coupling to a respective cathode terminal of each battery cell of a plurality of battery cells; and a plurality of negative contacts formed in the negative power plane, the negative contacts being for electrical coupling to a respective anode terminal of each battery cell of the plurality of battery cells.

20 Claims, 16 Drawing Sheets

Related U.S. Application Data

(60) Provisional application No. 62/186,977, filed on Jun. 30, 2015.

(51) Int. Cl.

| | |
|---|---|
| *H01M 10/613* | (2014.01) |
| *H01M 10/48* | (2006.01) |
| *H01M 10/643* | (2014.01) |
| *H01M 10/6567* | (2014.01) |
| *H01M 10/6556* | (2014.01) |
| *H01M 10/42* | (2006.01) |
| *H01M 10/0525* | (2010.01) |
| *H01M 10/625* | (2014.01) |
| *H01M 10/6554* | (2014.01) |
| *H01M 2/10* | (2006.01) |

(52) U.S. Cl.
CPC ....... *H01M 10/613* (2015.04); *H01M 10/643* (2015.04); *H01M 10/6554* (2015.04); *H01M 2220/20* (2013.01)

(56) References Cited

U.S. PATENT DOCUMENTS

| | | |
|---|---|---|
| 2001/0046624 A1 | 11/2001 | Goto et al. |
| 2008/0138698 A1 | 6/2008 | Ogami et al. |
| 2009/0023059 A1 | 1/2009 | Kinoshita et al. |
| 2009/0211277 A1 | 8/2009 | Rummel et al. |
| 2009/0220852 A1 | 9/2009 | Fujii |
| 2009/0297892 A1* | 12/2009 | Ijaz ...................... H01M 2/105 429/7 |
| 2010/0047682 A1* | 2/2010 | Houchin-Miller ........................... H01M 2/1077 429/120 |
| 2010/0271223 A1* | 10/2010 | Ohkura .............. G01R 31/3624 340/636.13 |
| 2010/0285346 A1 | 11/2010 | Graban et al. |
| 2011/0045334 A1 | 2/2011 | Meintschel et al. |
| 2011/0059346 A1 | 3/2011 | Jeong et al. |
| 2011/0097617 A1 | 4/2011 | Gu et al. |
| 2011/0129719 A1* | 6/2011 | Kwag ................. H01M 2/1077 429/159 |
| 2011/0135975 A1 | 6/2011 | Fuhr et al. |
| 2012/0177970 A1 | 7/2012 | Marchio et al. |
| 2012/0177971 A1 | 7/2012 | Cicero et al. |
| 2012/0183930 A1 | 7/2012 | Schaefer et al. |
| 2013/0157102 A1 | 6/2013 | Nagamatsu et al. |
| 2013/0306353 A1 | 11/2013 | Zhao |
| 2013/0344362 A1 | 12/2013 | Raisch et al. |
| 2014/0335381 A1 | 11/2014 | Krolak |
| 2015/0118530 A1* | 4/2015 | Lee ..................... H01M 10/486 429/82 |
| 2015/0188203 A1 | 7/2015 | Enomoto et al. |
| 2015/0194713 A1 | 7/2015 | Jin et al. |
| 2016/0172727 A1 | 6/2016 | Chan et al. |

FOREIGN PATENT DOCUMENTS

| | | |
|---|---|---|
| EP | 2738833 | 6/2014 |
| WO | WO 2007/047317 | 4/2007 |
| WO | WO 2008/109764 | 9/2008 |
| WO | WO 2011/149868 | 12/2011 |
| WO | WO 2013/056877 | 4/2013 |
| WO | WO 2013/155700 | 10/2013 |
| WO | WO 2015/041149 | 3/2015 |

OTHER PUBLICATIONS

Office Action in U.S. Appl. No. 14/841,617, dated Jun. 10, 2016.
Office Action in U.S. Appl. No. 14/866,907, dated Jan. 10, 2017.

\* cited by examiner

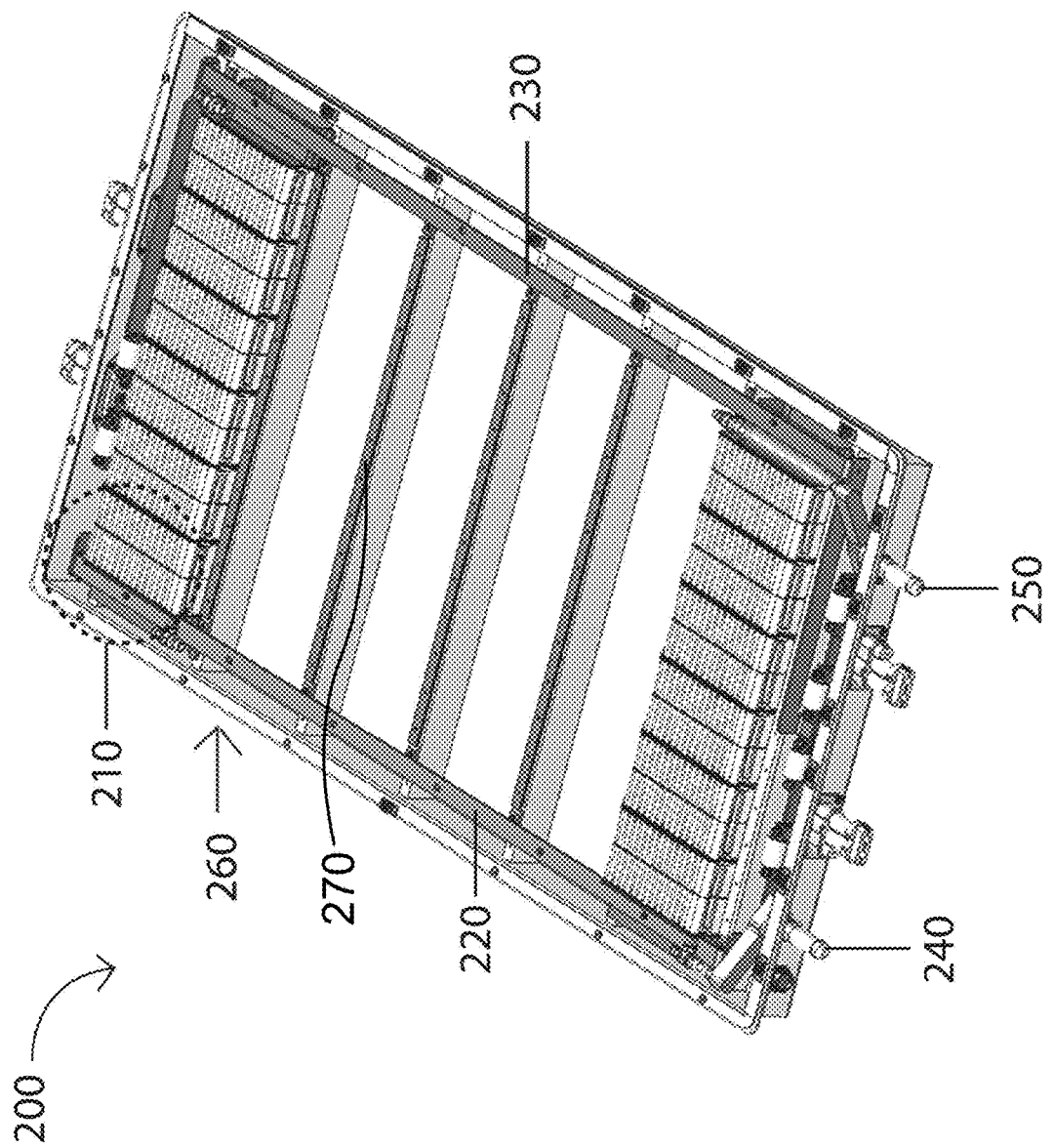

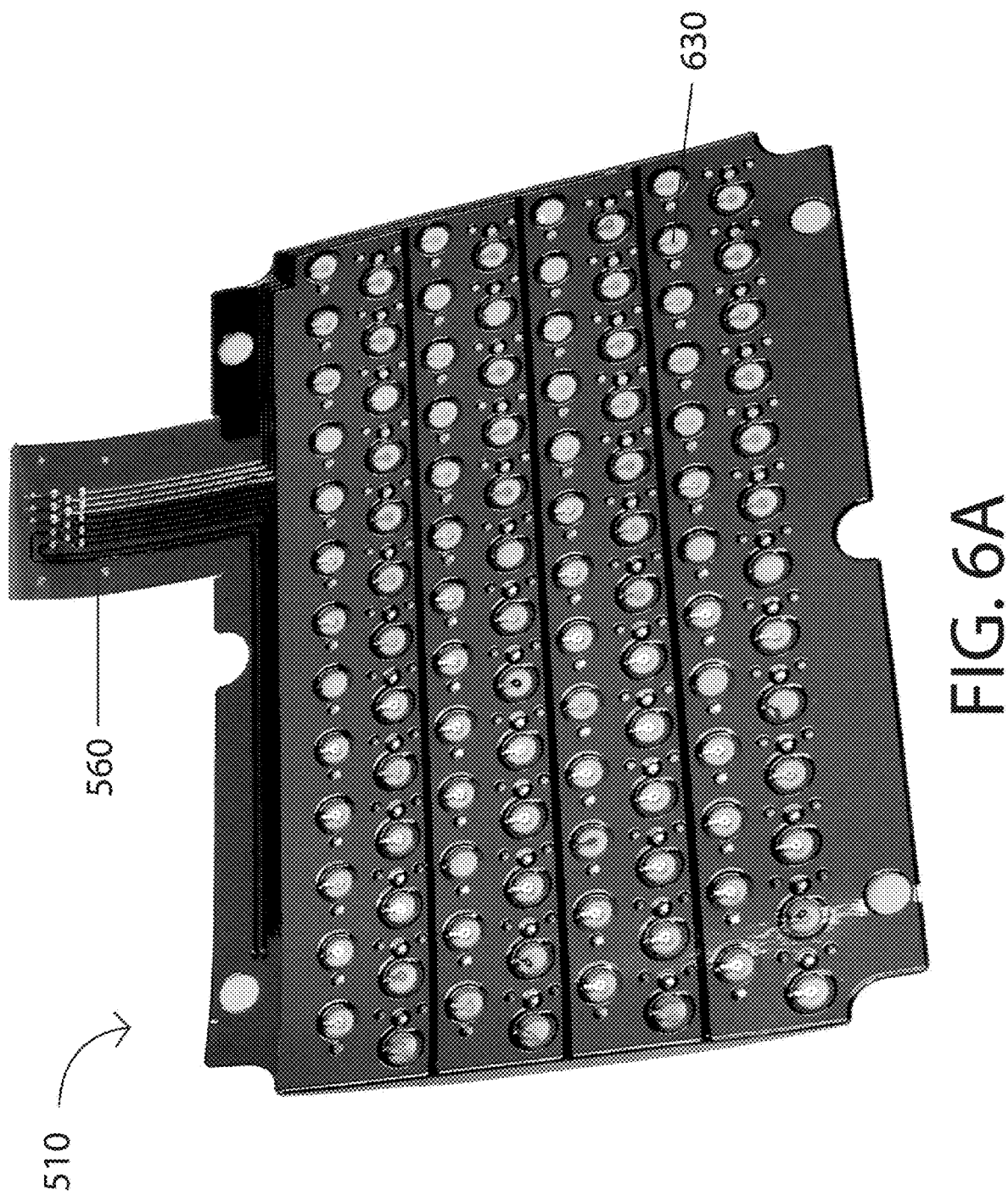

CURRENT CARRIER FOR VEHICLE ENERGY-STORAGE SYSTEMS

CROSS-REFERENCE TO RELATED APPLICATIONS

This application is a continuation-in-part of U.S. patent application Ser. No. 14/841,617, filed Aug. 31, 2015, which claims the benefit of U.S. Provisional Application No. 62/186,977, filed on Jun. 30, 2015. The subject matter of the aforementioned applications is incorporated herein by reference for all purposes.

FIELD

The present application relates generally to energy-storage systems, and more specifically to energy-storage systems for vehicles.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. However, present energy-storage systems have disadvantages including large size, inefficiency, and poor safety, to name a few. Similar to many sophisticated electrical systems, heat in automotive energy-storage systems should be carefully managed. Current thermal management schemes consume an inordinate amount of space. Present energy-storage systems also suffer from inefficiencies arising variously from imbalance among battery cells and resistance in various electrical connections. In addition, current energy-storage systems are not adequately protected from forces such as crash forces encountered during a collision.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present technology may be directed to current carriers for vehicle energy-storage systems comprising: a positive power plane; a negative power plane; a dielectric isolation layer disposed between the positive power plane and the negative power plane; a plurality of positive contacts formed in the positive power plane, the positive contacts being for electrical coupling to a respective cathode terminal of each battery cell of a plurality of battery cells; and a plurality of negative contacts formed in the negative power plane, the negative contacts being for electrical coupling to a respective anode terminal of each battery cell of the plurality of battery cells.

BRIEF DESCRIPTION OF THE DRAWINGS

Embodiments are illustrated by way of example and not limitation in the figures of the accompanying drawings, in which like references indicate similar elements.

FIG. 2B depicts a bottom part of an enclosure of a partial battery pack such as shown in FIG. 2A.

FIGS. 6A and 6B show a current carrier, according to various embodiments.

DETAILED DESCRIPTION

Figure 1:
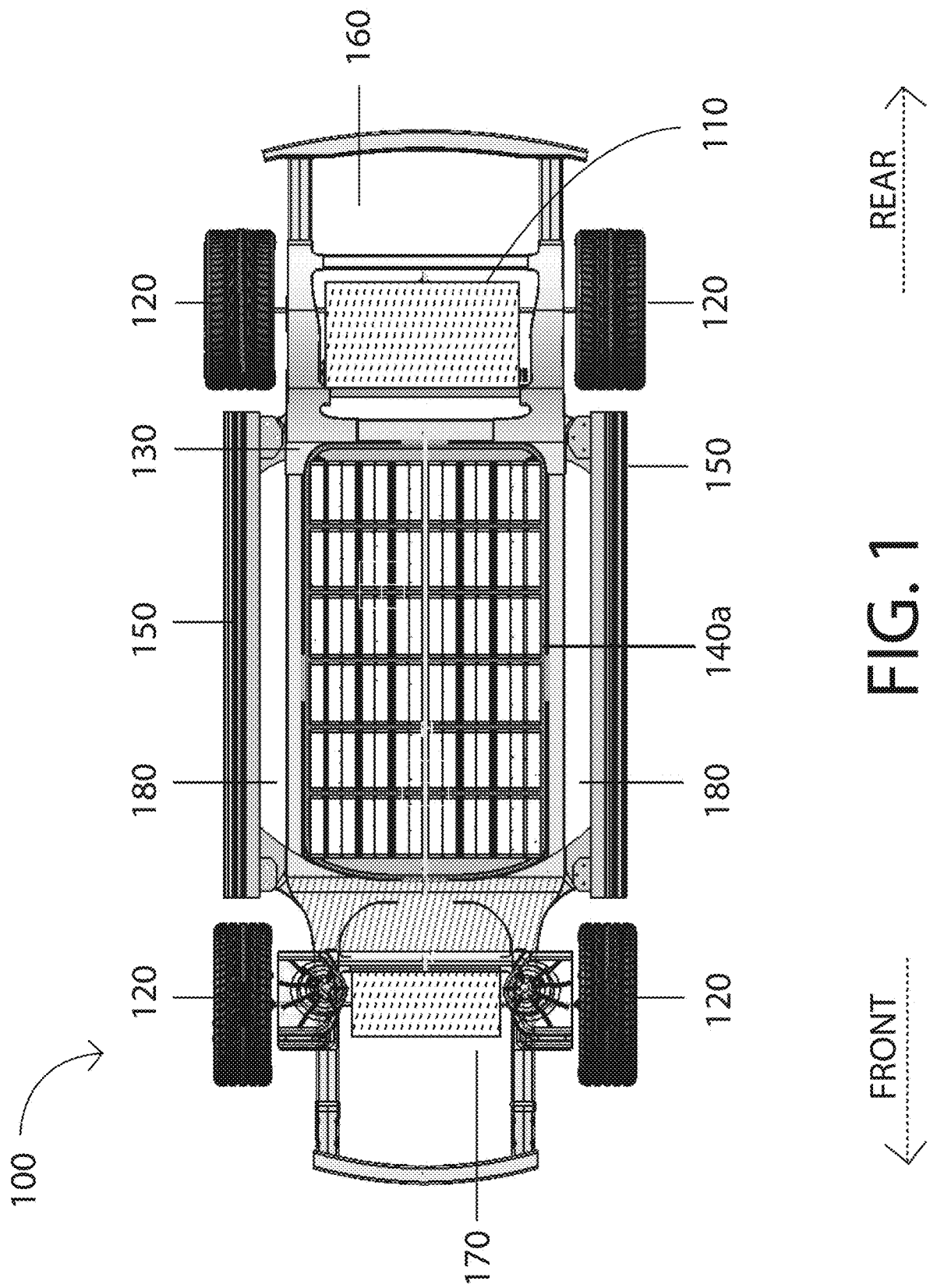
FIG. 1 illustrates an example environment in which an energy-storage system can be used.

While this technology is susceptible of embodiment in many different forms, there are shown in the drawings and will herein be described in detail several specific embodiments, with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Some embodiments of the present disclosure can be deployed in a wheeled, self-powered motor vehicle used for transportation, such as hybrid electric vehicles, plug-in hybrid electric vehicles, and all-electric vehicles. For example, FIG. 1 illustrates an electric car 100. Electric car 100 is an automobile propelled by one or more electric motors 110. Electric motor 110 can be coupled to one or more wheels 120 through a drivetrain (not shown in FIG. 1). Electric car 100 can include a frame 130 (also known as an underbody or chassis). Frame 130 is a supporting structure of electric car 100 to which other components can be attached/mounted, such as, for example, a battery pack 140a. Battery pack 140a can supply electricity to power one or more electric motors 110, for example, through an inverter. The inverter can change direct current (DC) from battery pack 140a to alternating current (AC), as required for electric motors 110, according to some embodiments.

As depicted in FIG. 1, battery pack 140a may have a compact "footprint" and be at least partially enclosed by frame 130 and disposed to provide a predefined separation, e.g. from structural rails 150 of an upper body that couples to frame 130. Accordingly, at least one of a rear crumple zone 160, a front crumple zone 170, and a lateral crumple zone 180 can be formed around battery pack 140a. Both the frame 130 and structural rails 150 may protect battery pack 140a from forces or impacts exerted from outside of electric car 100, for example, in a collision. In contrast, other battery packs which extend past at least one of structural rails 150, rear crumple zone 160, and front crumple zone 170 remain vulnerable to damage and may even explode in an impact.

Battery pack 140a may have a compact "footprint" such that it may be flexibly used in and disposed on frame 130 having different dimensions. Battery pack 140a can also be disposed in frame 130 to help improve directional stability (e.g., yaw acceleration). For example, battery pack 140a can be disposed in frame 130 such that a center of gravity of electric car 100 is in front of the center of the wheelbase (e.g., bounded by a plurality of wheels 120).

Figure 2A:
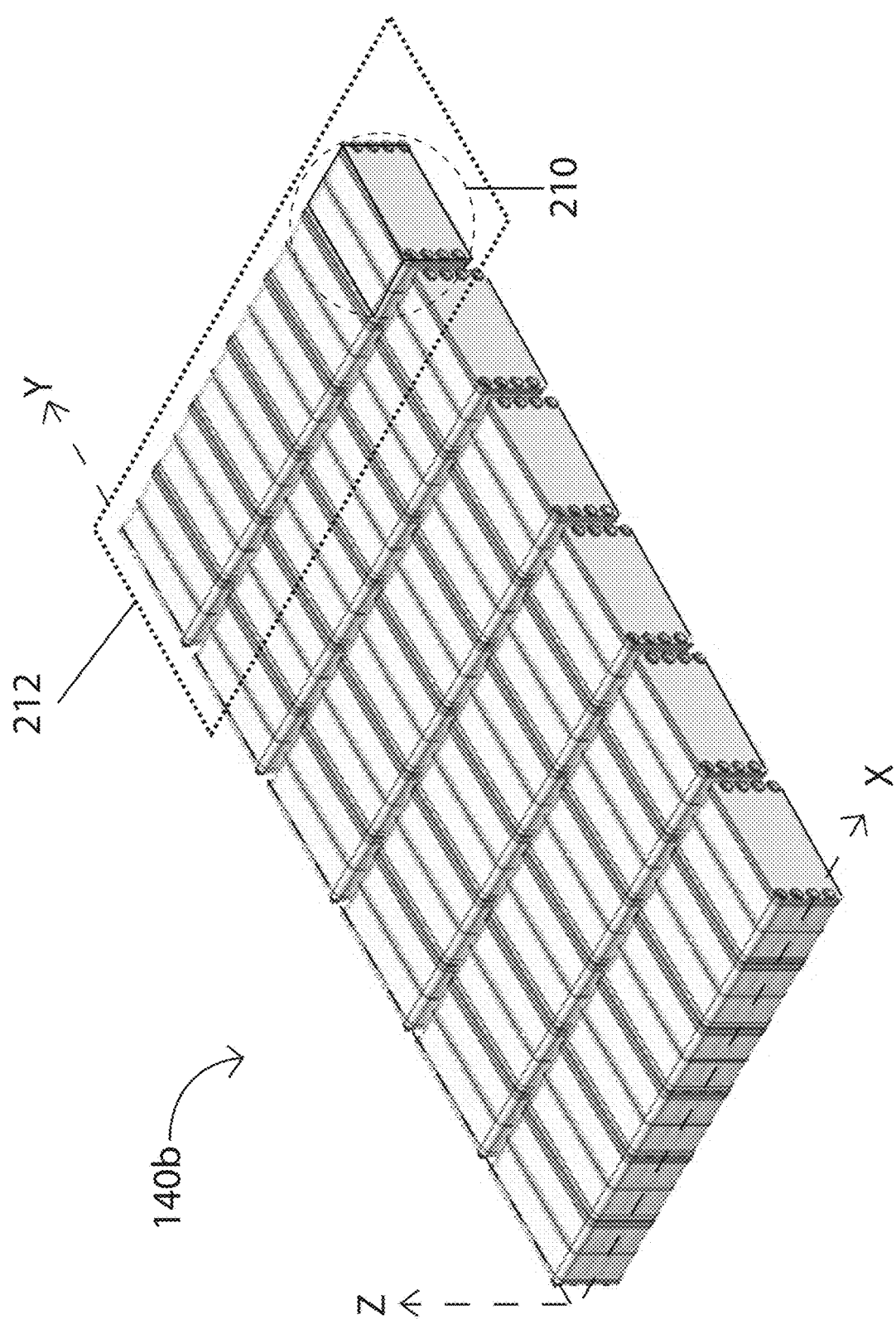
FIG. 2A shows an orientation of battery modules in an energy-storage system, according to various embodiments of the present disclosure.

FIG. 2A shows a battery pack 140b with imaginary x-, y-, and z-axis superimposed, according to various embodiments. Battery pack 140b can include a plurality of battery modules 210. In the non-limiting example, battery pack 140b can be approximately 1000 mm wide (along x-axis), 1798 mm long (along y-axis), and 152 mm high (along z-axis), and can include 36 of battery modules 210.

FIG. 2B illustrates an exemplary enclosure 200 for battery pack 140b having a cover removed for illustrative purposes. Enclosure 200 includes tray 260 and a plurality of battery modules 210. The tray 260 may include a positive bus bar 220 and a negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 is electrically coupled to a positive terminal 240 of enclosure 200. Negative bus bar 230 can be electrically coupled to a negative terminal 250 of enclosure 200. As described above with reference to FIG. 1, because bus bars 220 and 230 are within structural rails 150, they can be protected from collision damage.

According to some embodiments, negative bus bar 230 and positive bus bar 220 are disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140b) due to a deformity caused by an impact.

As will be described further in more detail with reference to FIG. 5, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140b (e.g., along the z-axis), in various embodiments.

The x-axis cell orientation of battery modules 210 in battery pack 140b shown in FIGS. 2A and 2B can be advantageous for efficient electrical and fluidic routing to each of battery module 210 in battery pack 140b. For example, at least some of battery modules 210 can be electrically connected in a series forming string 212, and two or more of string 212 can be electrically connected in parallel. This way, in the event one of string 212 fails, others of string 212 may not be affected, according to various embodiments.

Figure 3:
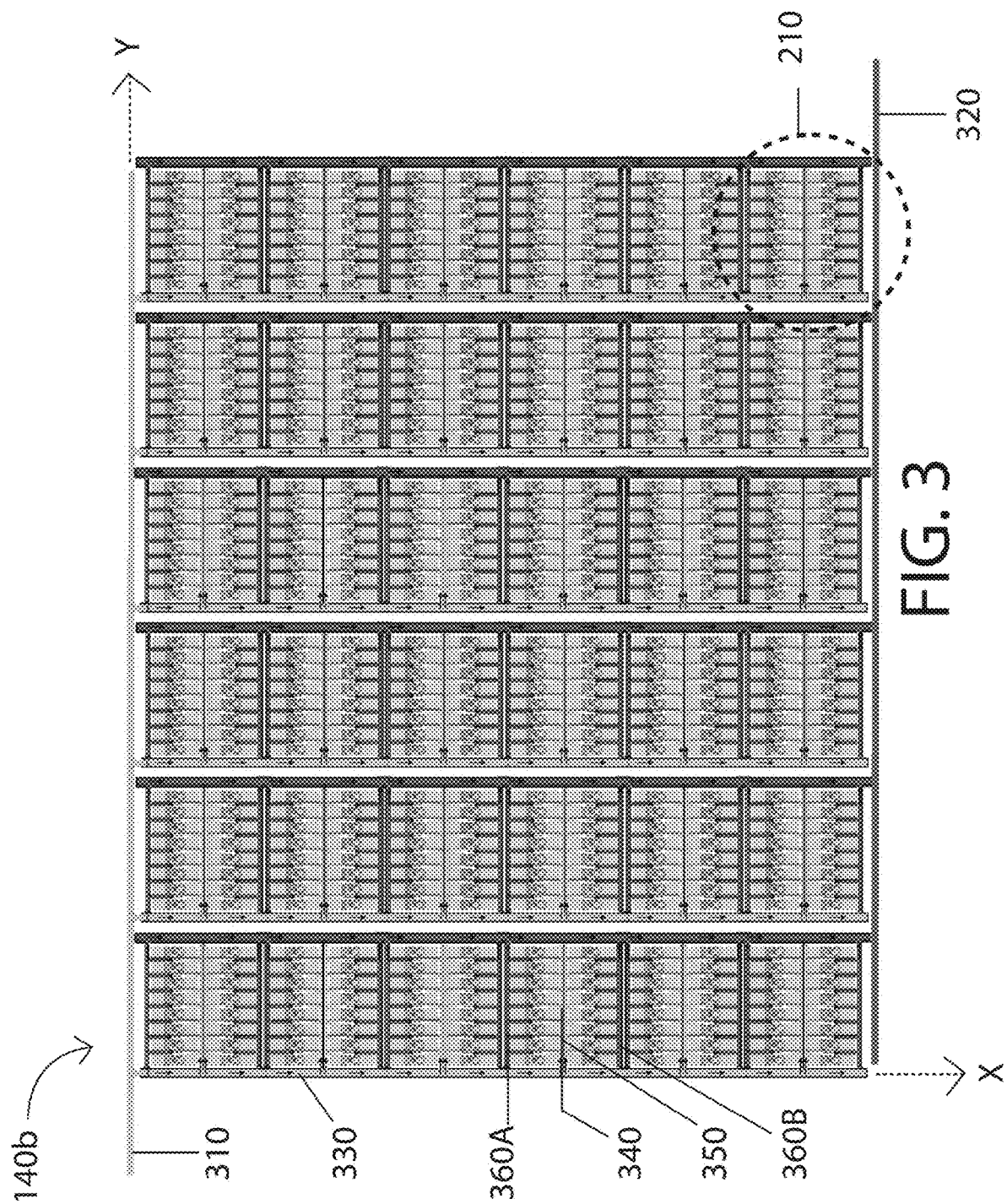
FIG. 3 is a simplified diagram illustrating coolant flows, according to example embodiments.

FIG. 3 illustrates coolant flows and operation of a coolant system and a coolant sub-system according to various embodiments. As shown in FIG. 3, the x-axis cell orientation can be advantageous for routing coolant (cooling fluid) in parallel to each of battery modules 210 in battery pack 140b. Coolant can be pumped into battery pack 140b at ingress 310 and pumped out of battery pack 140b at egress 320. A resulting pressure gradient within battery pack 140b can provide sufficient circulation of coolant to minimize a temperature gradient within battery pack 140b (e.g., a temperature gradient within one of battery modules 210, a temperature gradient between battery modules 210, and/or a temperature gradient between two or more of string 212 shown in FIG. 2A).

Within battery pack 140b, the coolant system may circulate the coolant, for example, to battery modules 210 (e.g., the circulation is indicated by reference numeral 330). One or more additional pumps (not shown in FIG. 3) can be used to maintain a roughly constant pressure between multiple battery modules 210 connected in series (e.g., in string 212 in FIG. 2A) and between such strings. Within each battery module 210, the coolant sub-system may circulate the coolant, for example, between and within two half modules 410 and 420 shown in FIG. 4 (e.g., the circulation indicated by reference numeral 340). In some embodiments, the coolant can enter each battery module 210 through an interface 350 between two half modules 410 and 420, in a direction (e.g., along the y- or z-axis) perpendicular to the cylindrical body of each battery cell, and flow to each cell. Driven by pressure within the coolant system, the coolant then can flow along the cylindrical body of each battery (e.g., along the x-axis) and may be collected at the two (opposite) side surfaces 360A and 360B of the module that can be normal to the x-axis. In this way, heat can be efficiently managed/dissipated and thermal gradients minimized among all battery cells in battery pack 140b, such that a temperature may be maintained at an approximately uniform level.

In some embodiments, parallel cooling, as illustrated in FIG. 3, can maintain temperature among battery cells in battery pack 140b at an approximately uniform level such that a direct current internal resistance (DCIR) of each battery cell is maintained at a substantially predefined resistance. The DCIR can vary with a temperature, therefore, keeping each battery cell in battery pack 140b at a substantially uniform and predefined temperature can result in each battery cell having substantially the same DCIR. Since a voltage across each battery cell can be reduced as a function of its respective DCIR, each battery cell in battery pack 140b may experience substantially the same loss in voltage. In this way, each battery cell in battery pack 140b can be maintained at approximately the same capacity and imbalances between battery cells in battery pack 140b can be minimized.

In some embodiments, when compared to techniques using metal tubes to circulate coolant, parallel cooling can enable higher battery cell density within battery module 210 and higher battery module density in battery pack 140b. In some embodiments, coolant or cooling fluid may be at least one of the following: synthetic oil, for example, poly-alpha-olefin (or poly-α-olefin, also abbreviated as PAO) oil, ethylene glycol and water, liquid dielectric cooling based on phase change, and the like.

Figure 4:
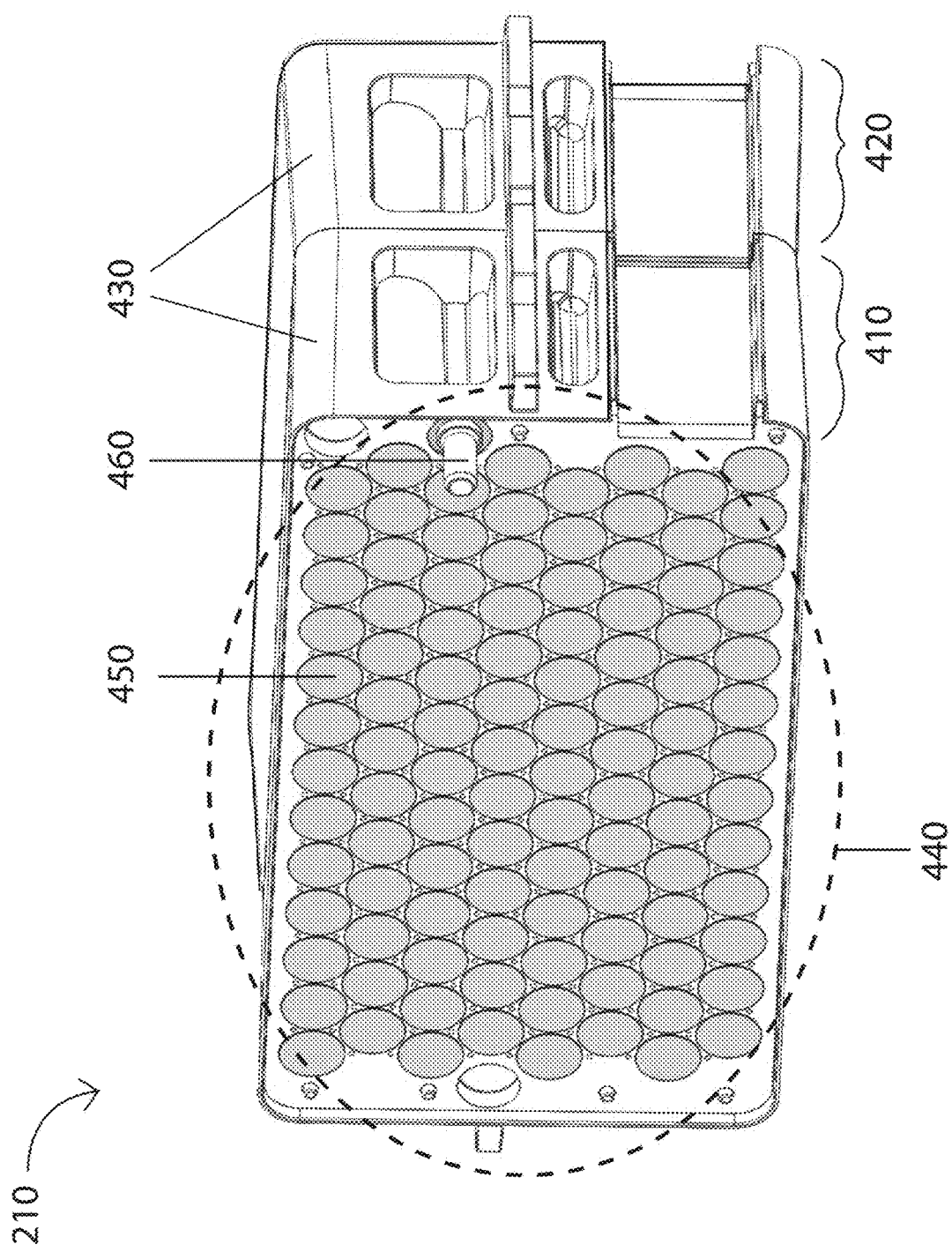
FIG. 4 is a simplified diagram of a battery module, according to various embodiments of the present disclosure.

FIG. 4 illustrates battery module 210 according to various embodiments. A main power connector 460 can provide power from battery cells 450 to outside of battery module 210. In some embodiments, battery module 210 can include two half modules 410 and 420, each having an enclosure 430. Enclosure 430 may be made using one or more plastics having sufficiently low thermal conductivities. Respective enclosures 430 of each of the two half modules 410 and 420 may be coupled with each other to form the housing for battery module 210.

FIG. 4 includes a view 440 of enclosure 430 (e.g., with a cover removed). For each of half modules 410, 420 there is shown a plurality of battery cells 450 oriented (mounted) horizontally (see also FIG. 5 and FIG. 8). By way of non-limiting example, each half module includes one hundred four of battery cells 450. By way of further non-limiting example, eight of battery cells 450 are electrically connected in a series (e.g., the staggered column of eight battery cells 450 shown in FIG. 4), with a total of thirteen of such groups of eight battery cells 450 electrically connected in series. By way of additional non-limiting example, the thirteen groups (e.g., staggered columns of eight battery cells 450 electrically coupled in series) are electrically connected in parallel. This example configuration may be referred to as "8S13P" (8 series, 13 parallel). In some embodiments, the 8S13P electrical connectivity can be provided by current carrier 510, described further below in relation to FIGS. 5 and 6. Other combinations and permutations of battery cells 450 electrically coupled in series and/or parallel may be used.

Figure 5:
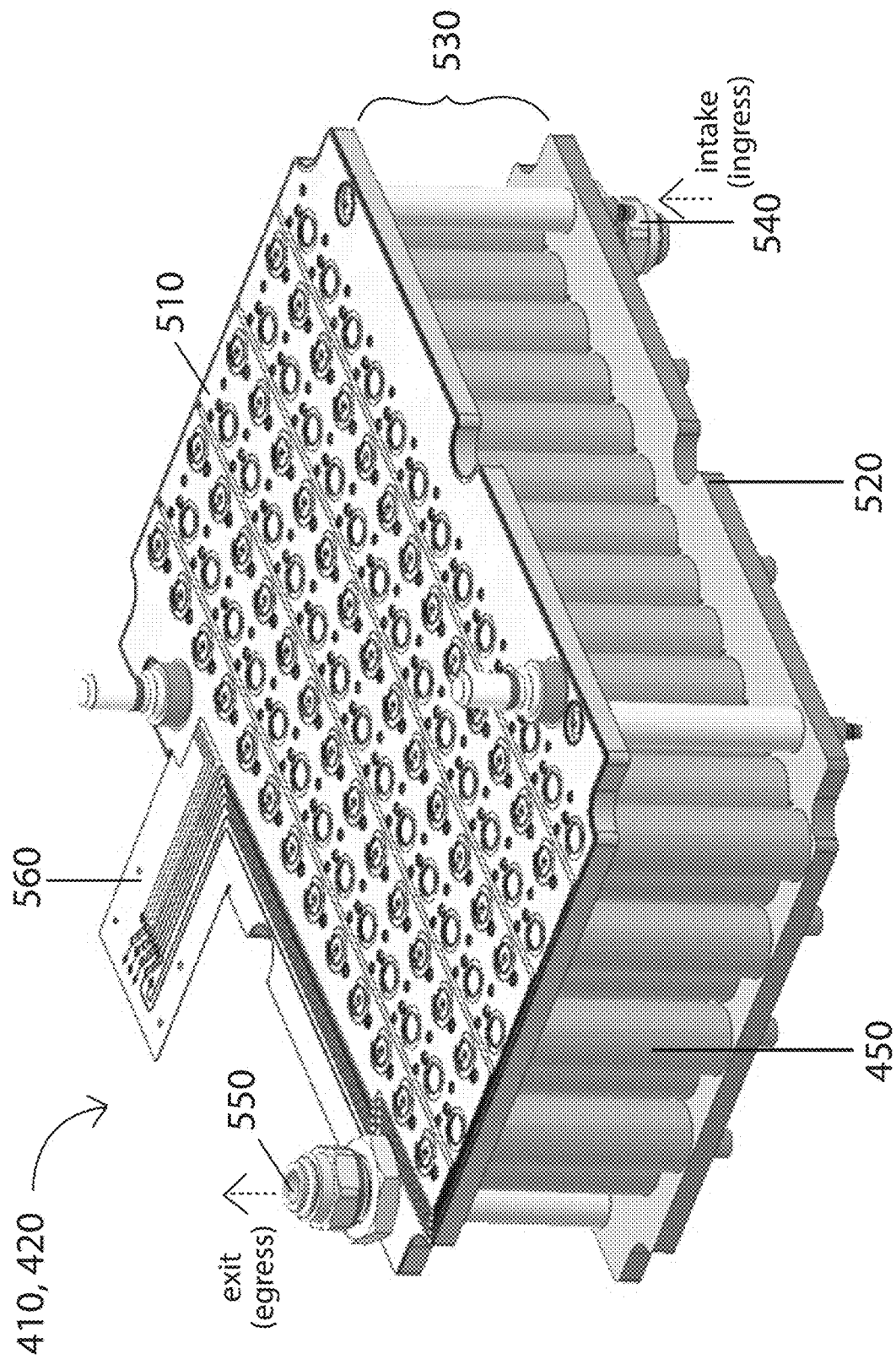
FIG. 5 illustrates a half module, in accordance with various embodiments.

FIG. 5 depicts a view of half modules 410, 420 without enclosure 430 in accordance with various embodiments. Half modules 410 and 420 need not be the same, e.g., they may be mirror images of each other in some embodiments. Half modules 410 and 420 can include a plurality of battery cells 450. The plurality of battery cells 450 can be disposed between current carrier 510 and blast plate 520 such that an exterior side of each of battery cells 450 is not in contact with the exterior sides of other (e.g., adjacent) battery cells 450. In this way, coolant can circulate among and between battery cells 450 to provide submerged, evenly distributed cooling. In addition, to save the weight associated with coolant in areas where cooling is not needed, air pockets can be formed using channels craftily designed in the space 530 between current carrier 510 and blast plate 520 not occupied by battery cells 450. Coolant can enter half modules 410, 420 through coolant intake 540, is optionally directed by one or more flow channels, circulates among and between the plurality of battery cells 450, and exits through coolant outtake 550. In some embodiments, coolant intake 540 and coolant outtake 550 can each be male or female fluid fittings. In some embodiments, coolant or cooling fluid is at least one of: synthetic oil such as poly-alpha-olefin (or poly-α-olefin, abbreviated as PAO) oil, ethylene glycol and water, liquid dielectric cooling based on phase change, and the like. Compared to techniques using metal tubes to circulate coolant, submerged cooling improves a packing density of battery cells 450 (e.g., inside battery module 210 and half modules 410, 420) by 15%, in various embodiments.

Figure 6B:
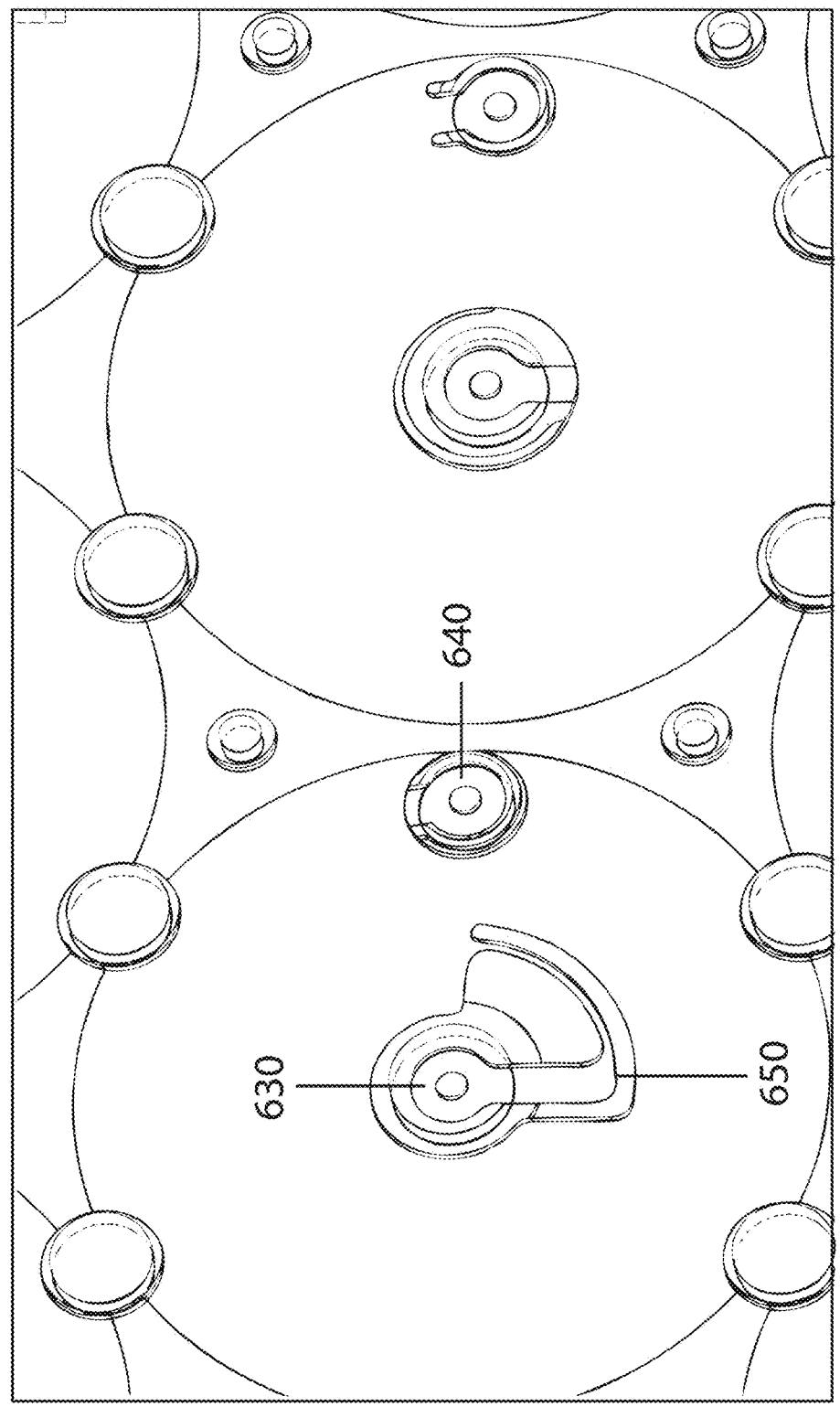

FIGS. 6A and 6B depict current carrier 510, 510A according to various embodiments. Current carrier 510, 510A is generally flat (or planar) and comprises one or more layers (not shown in FIGS. 6A and 6B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 510) to outside of battery module 210.

As depicted in FIG. 6B, current carrier 510A can be a magnified view of a portion of current carrier 510, for illustrative purposes. Current carrier 510A can be communicatively coupled to each of battery cells 450, for example, at a separate (fused) positive (+) portion 630 and a separate negative (−) portion 640 which may be electrically coupled to the positive power plane and negative power plane (respectively) of current carrier 510A, and to each cathode and anode (respectively) of a battery cell 450. In some embodiments, positive (+) portion 630 can be laser welded to a cathode terminal of battery cell 450, and negative (−) portion 640 can be laser welded to an anode terminal of battery cell 450. In some embodiments, the laser-welded connection can have on the order of 5 milli-Ohms resistance. In contrast, electrically coupling the elements using ultrasonic bonding of aluminum bond wires can have on the order of 10 milli-Ohms resistance. Laser welding advantageously can have lower resistance for greater power efficiency and take less time to perform than ultrasonic wire bonding, which can contribute to greater performance and manufacturing efficiency.

Current carrier 510A can include a fuse 650 formed from part of a metal layer (e.g., copper, aluminum, etc.) of current carrier 510A, such as in the positive power plane. In some embodiments, the fuse 650 can be formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 450 (e.g., due to an internal short circuit), the fuse may "blow," breaking the electrical connection to the battery cell 450 and electrically isolating the battery cell 450 from current carrier 510A. Although an example of a fuse formed in the positive power plane is provided, a fuse may additionally or alternatively be a part of the negative power plane.

Additional thermal runaway control can be provided in various embodiments by scoring on end 740 (identified in FIG. 7) of the battery cell 450. The scoring can promote rupturing to effect venting in the event of over pressure. In various embodiments, all battery cells 450 may be oriented to allow venting into the blast plate 520 for both half modules.

In some embodiments, current carrier 510 can be comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers (FEP), and copolymers.

In addition to electrically coupling battery cells 450 to each other (e.g., in series and/or parallel), current carrier 510 can provide electrical connectivity to outside of battery module 210, for example, through main power connector 460 (FIG. 4). Current carrier 510 may also include electrical interface 560 (FIGS. 5, 6A) which transports signals from the signal plane. Electrical interface 560 can include an electrical connector (not shown in FIGS. 5, 6A).

Figure 7:
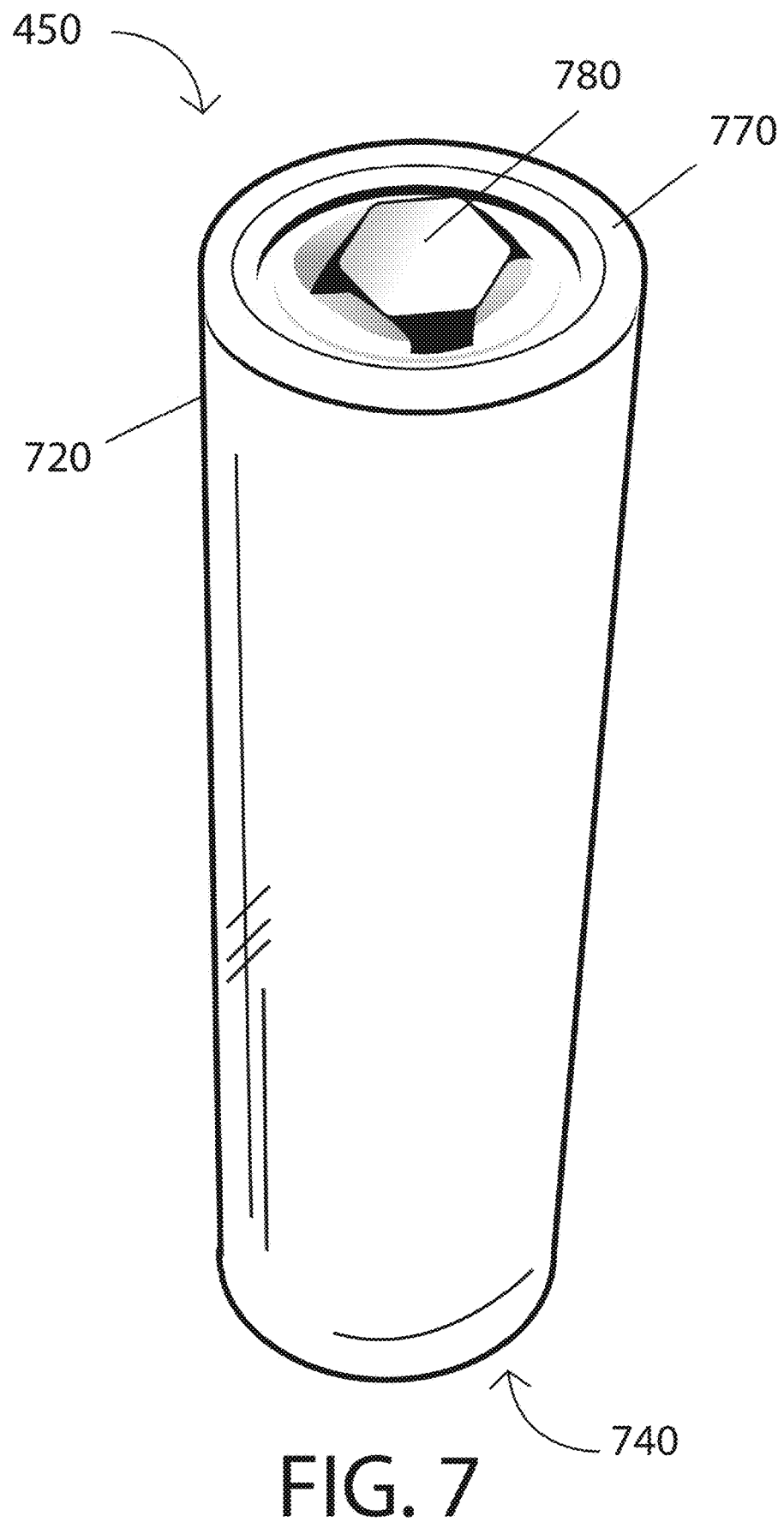
FIG. 7 depicts an example battery cell.

FIG. 7 shows battery cell 450 according to some embodiments. In some embodiments, battery cell 450 can be a lithium ion (li-ion) battery. For example, battery cell 450 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 450 may include can 720 (e.g., the cylindrical body), anode terminal 770, and cathode terminal 780. For example, anode terminal 770 can be a negative terminal of battery cell 450 and cathode terminal 780 can be a positive terminal of battery cell 450. Anode terminal 770 and cathode terminal 780 can be electrically isolated from each other by an insulator or dielectric.

Figure 8:
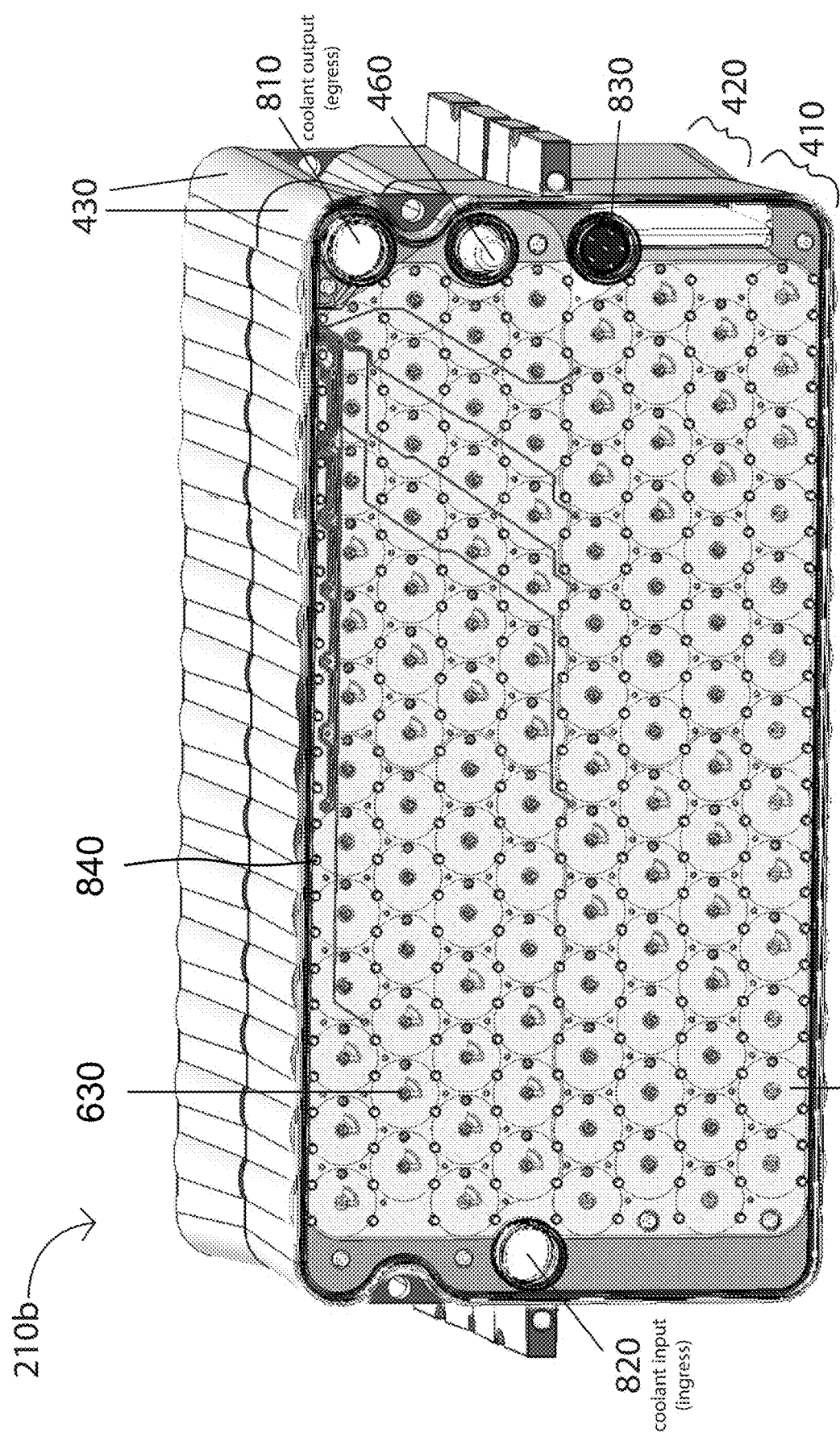
FIGS. 8 and 9 illustrate further embodiments of a battery module.

FIG. 8 illustrates another example of a battery module, battery module 210b, according to various embodiments. As described in relation to battery module 210 in FIG. 4, battery module 210b may include two half modules 410 and 420 and main power connector 460. Each of half modules 410 and 420 may include one of enclosure 430 for housing battery cells therein. Battery module 210b further depicts main coolant input port 820, main coolant output port 810, and communications and low power connector 830. Coolant can be provided to battery module 210b at main coolant input port 820, circulated within battery module 210b, and received at main coolant output port 810.

In contrast to the view of battery module 210 in FIG. 4, FIG. 8 depicts current carrier 510. Battery module 210b may include one or more staking features 840 to hold current carrier 510 in battery module 210b. For example, staking feature 840 can be a plastic stake. In some embodiments, communications and low power connector 830 can be at least partially electrically coupled to the signal plane and/or electrical interface 560 of current carrier 510, for example, through electronics for data acquisition and/or control (not shown in FIG. 8). Communications and low power connector 830 may provide low power, for example, to electronics for data acquisition and/or control, and sensors.

Figure 9:
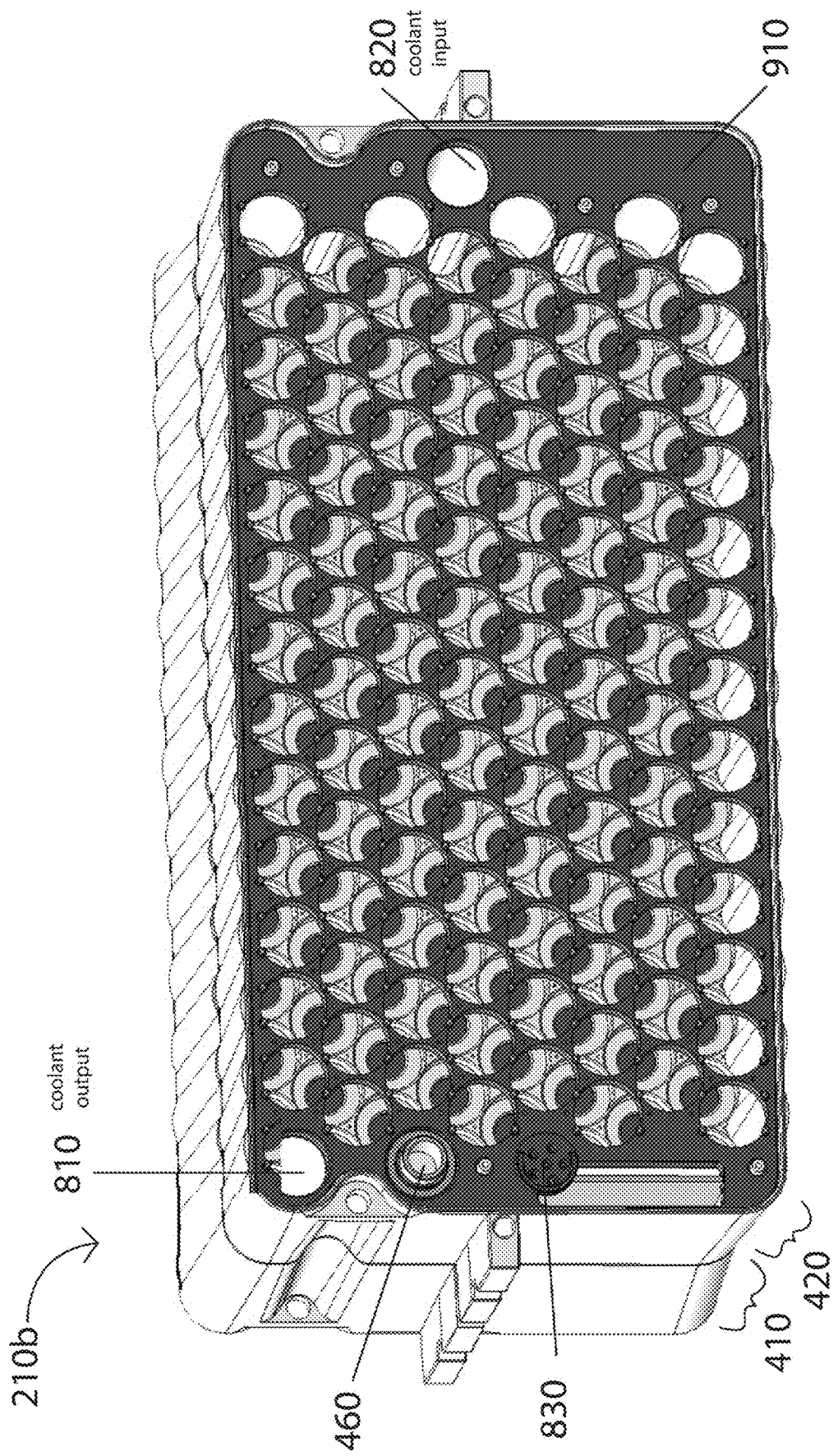

FIG. 9 shows another view of battery module 210b where the battery cells and the current carrier are removed from one of the half modules, for illustrative purposes. As described in relation to FIGS. 4 and 8, battery module 210b may include two half modules 410 and 420, main power connector 460, main coolant output port 810, main coolant input port 820, and communications and low power connector 830. Each of the half modules 410 and 420 can include an enclosure 430. Each enclosure 430 may further include plate 910 (e.g., a bracket). Plate 910 may include structures for securing the battery cells within enclosure 430 and maintaining the distance between battery cells.

Figure 10A:
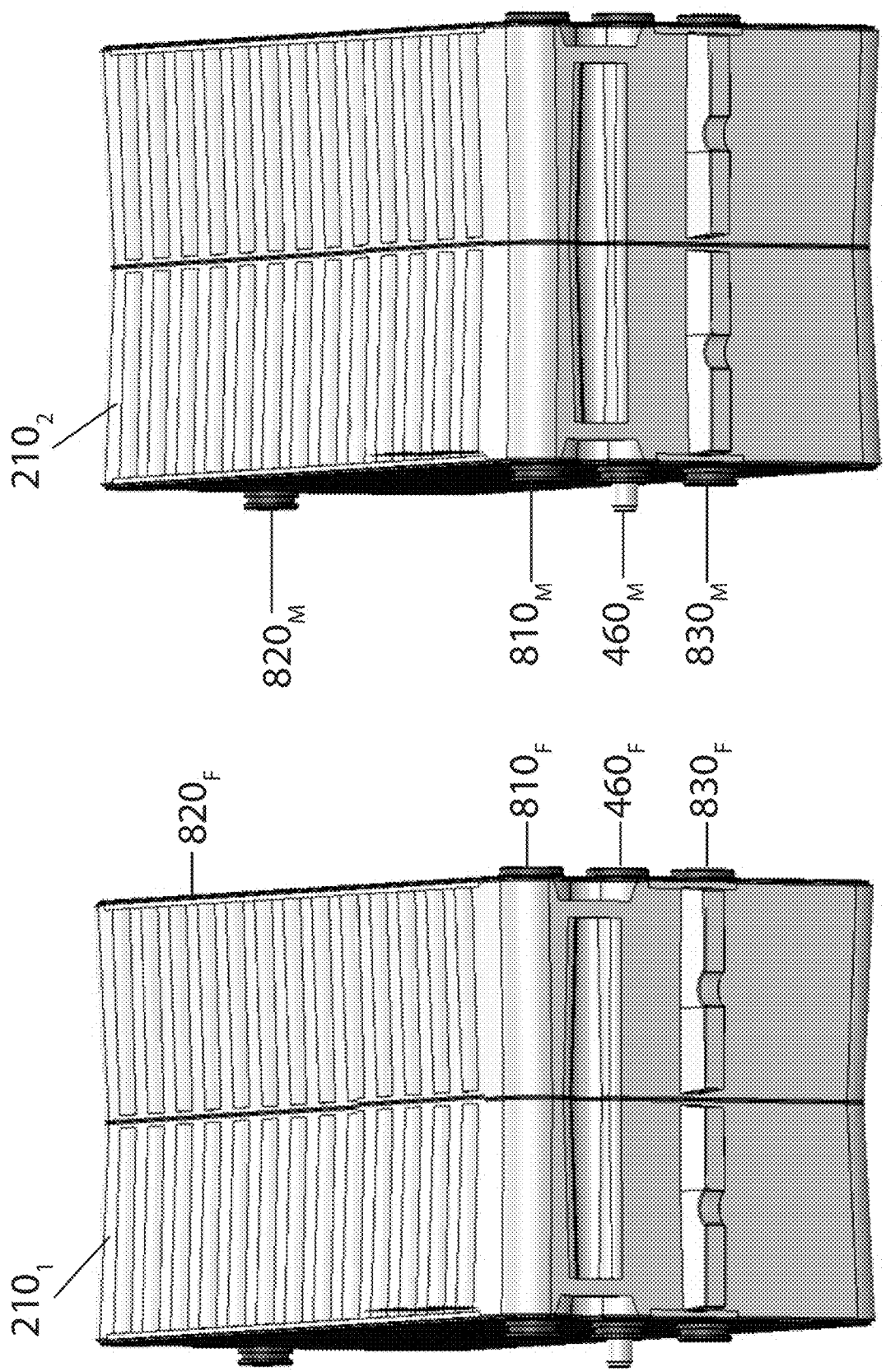
FIGS. 10A and 10B show battery module coupling, according to some embodiments.
Figure 10B:
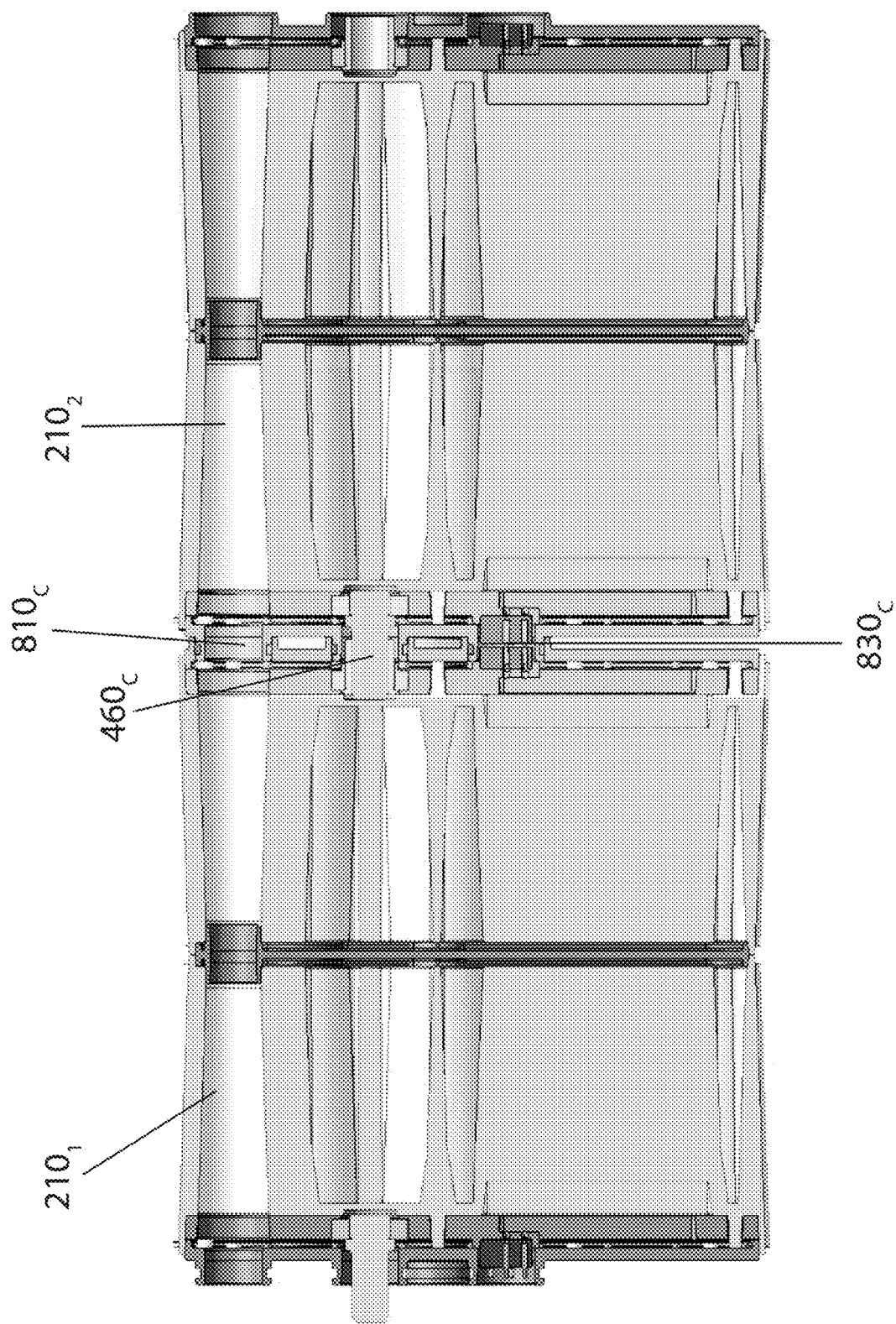

FIGS. 10A and 10B illustrate arrangement and coupling between two of battery modules 210b (FIG. 9): $210_1$ and $210_2$. From different perspective views, FIG. 10A depicts battery modules $210_1$ and $210_2$ being apart and aligned for coupling. For example, battery modules $210_1$ and $210_2$ are positioned as shown in FIG. 10A and moved together until coupled as shown in the example in FIG. 10B. Generally, a female receptacle on one of battery modules $210_1$ and $210_2$ may receive and hold a male connector on the other of battery modules $210_2$ and $210_1$, respectively.

As shown in the example in FIG. 10A, a left side of battery modules $210_1$ and $210_2$ may have male connectors and a right side of battery modules $210_1$ and $210_2$ have female connectors, according to some embodiments. For example, the left sides of battery modules $210_1$ and $210_2$ include male main power connector $460_M$, male main coolant output port $810_M$, male main coolant input port $820_M$, and male communications and low power connector $830_M$. By way of further non-limiting example, the right sides of battery modules $210_1$ and $210_2$ can include female main power connector $460_F$, female main coolant output port $810_F$, female main coolant input port $820_F$, and female communications and low power connector $830_F$. Each of female main power connector $460_F$, female main coolant output port $810_F$, female main coolant input port $820_F$, and female communications and low power connector $830_F$ may include an (elastomer) o-ring or other seal. Other combinations and permutations of male and female connectors—such as a mix of male and female connectors on each side, and female connectors on the right side and male connectors on the left side—may be used.

FIG. 10B depicts a cross-sectional view of battery modules $210_1$ and $210_2$ of FIG. 10A coupled together. For example, male main power connector $460_M$ and female main power connector $460_F$ (FIG. 10A) can combine to form coupled main power connectors $460_C$, male main coolant output port $810_M$ and female main coolant output port $810_F$ can combine to form coupled main coolant output ports $810_C$, male main coolant input port $820_M$ and female main coolant input port $820_F$ can combine to form coupled main coolant input ports $820_C$ (not shown in FIG. 10B), and female communications and low power connector $830_F$ and male communications and low power connector $830_M$ can combine to form coupled communications and low power connectors $830_C$. As a result, the internal cooling channels or manifolds of the battery modules can be connected through the coupling between the modules, forming the cooling system schematically illustrated in FIG. 3.

Figure 11A:
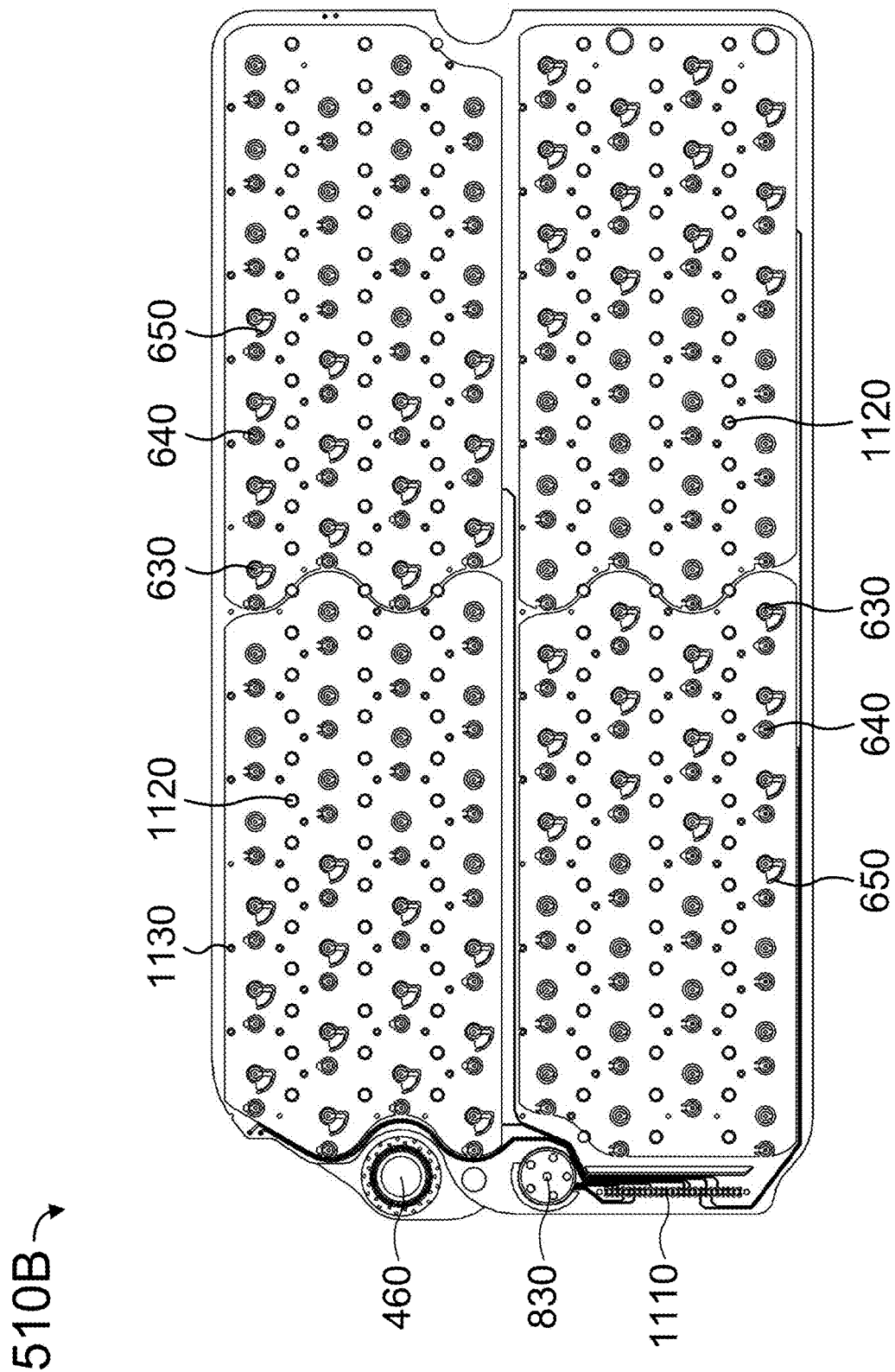
FIGS. 11A-11C depict different perspective views of a current carrier, according to some embodiments.
Figure 11B:
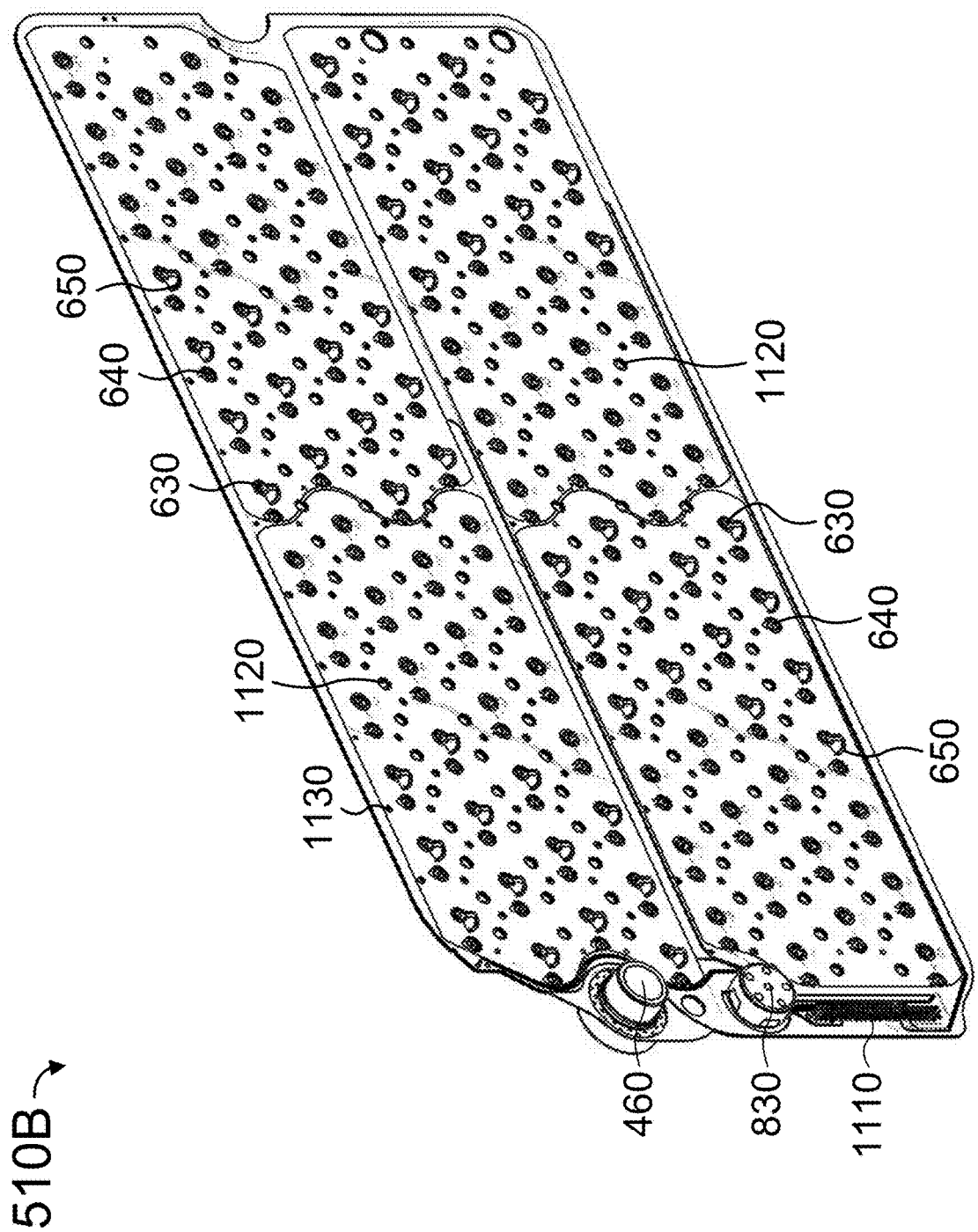
Figure 11C:
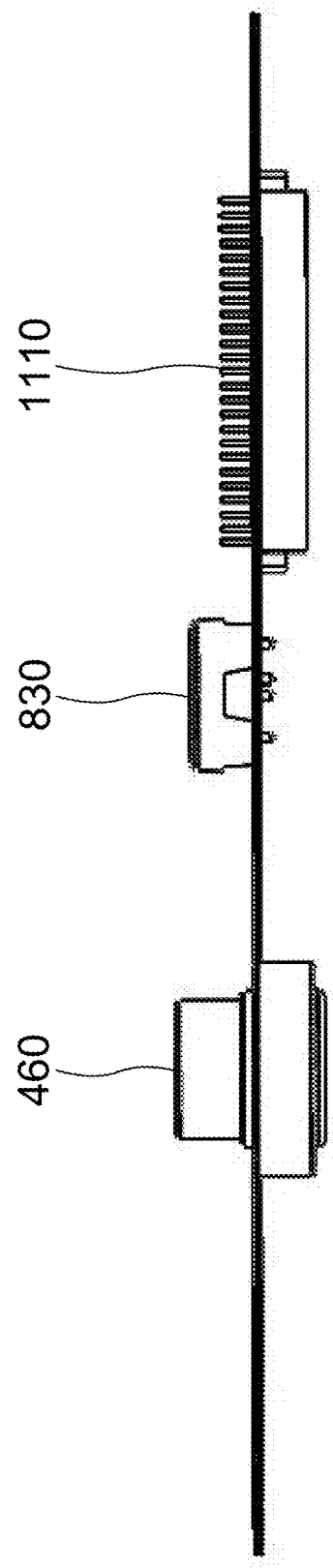

FIGS. 11A-11C illustrate different perspective views of current carrier 510B according to some embodiments, for illustrative purposes. Current carrier 510B can include at least some of the materials, design, construction, features, operations, etc. as were described for current carrier 510(A) (FIGS. 5, 6A, 6B, and 8). For example, current carrier 510B can include positive (+) portion 630, negative (−) portion 640, and fuse 650 (FIG. 6B).

By way of further example, current carrier 510B can include main power connector 460 (FIGS. 4, 8, and 9) and communications and low power connector 830. Current carrier 510B may also include a telemetry board connector 1110, for example, to communicatively couple a telemetry board (not shown in FIGS. 11A-11C) with current carrier 510B and communications and low power connector 830 (FIGS. 8 and 9). For example, the telemetry board may include electronics for data acquisition and/or control, and sensors (as were described above in relation to FIG. 8), such as for battery module telemetry (as was described above in relation to FIGS. 6A and 6B).

Current carrier 510B may include small holes 1130, through which current carrier 510B can be affixed to plate (retainer) 910 (FIG. 9) (not shown in FIGS. 11A-11C). For example, current carrier 510B can be hot staked to plate (retainer) 910 through small holes 1130. By way of further non-limiting example, small holes 1130 can be coupled to staking features 840 (FIG. 8). Current carrier 510B may include medium holes 1120, through which coolant can circulate. In an additional non-limiting example, medium holes 1120 can be coupled to staking features 840 (FIG. 8). Current carrier 510B may include small holes 1130, through which coolant can circulate.

As would be readily appreciated by one of ordinary skill in the art, various embodiments described herein may be used in additional applications, such as in energy-storage systems for wind and solar power generation. Other applications are also possible.

The description of the present technology has been presented for purposes of illustration and description, but is not intended to be exhaustive or limited to the disclosure in the form disclosed. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

What is claimed is:

1. A current carrier comprising:
   a positive power plane comprising a first metal layer;
   a negative power plane comprising a second metal layer, wherein at least one of the first and second metal layers includes at least one fuse formed from the first metal layer or the second metal layer, respectively, for each of a plurality of battery cells coupled to the positive and negative power planes;
   a plurality of holes, the holes conducting a liquid coolant from a first position in contact with the positive power plane to a second position in contact with the negative power plane;
   a dielectric isolation layer disposed between the positive power plane and the negative power plane;
   a plurality of positive contacts formed in the positive power plane, each positive contact welded to a respective cathode terminal of a battery cell of the plurality of battery cells; and
   a plurality of negative contacts formed in the negative power plane, each negative contact welded to a respective anode terminal of a battery cell of the plurality of battery cells,
   wherein for each battery cell of the plurality of battery cells, at least one of the negative contact and the positive contact is coupled to one of the at least one fuse formed from the first metal layer or the second metal layer, respectively.

2. The current carrier of claim 1, wherein the first metal layer includes the at least one fuse formed in the positive power plane, and electrically coupled to the respective positive contact of the plurality of positive contacts.

3. The current carrier of claim 2 further comprising:
   a signal layer;
   a second dielectric isolation layer disposed adjacent to the signal layer;
   at least one sensor, each sensor of the at least one sensor being communicatively coupled to the signal layer and disposed adjacent to a respective battery cell of the plurality of battery cells; and
   a communications connector communicatively coupled to the signal layer.

4. The current carrier of claim 3 further comprising:
   a power connection electrically coupled separately to the positive power plane and the negative power plane.

5. The current carrier of claim 1, wherein each positive contact is laser or ultrasonically welded to the respective cathode terminal of the battery cell and each negative contact is laser or ultrasonically welded to the respective anode of the battery cell.

6. The current carrier of claim 1 further comprising: a printed circuit board comprising at least one of copper, FR-2, FR-3, FR-4, FR-5, FR-6, G-10, CEM-1, CEM-2, CEM-3, CEM-4, and CEM-5.

7. The current carrier of claim 1 further comprising: a flexible printed circuit comprising at least one of copper foil, polyester, polyimide, polyethylene naphthalate, polyetherimide, fluoropolymers, and copolymers.

8. The current carrier of claim 1, wherein the battery cells are cylindrical rechargeable cells.

9. A vehicle energy-storage system comprising:
   a plurality of modules, each module comprising:
      two half modules coupled together, each half module including:
         a plurality of battery cells, the battery cells each having a first end and a second end, the first end distal from the second end, and having an anode terminal and a cathode terminal being disposed at the first end, the cells being oriented and mounted horizontally in each half module;
         a current carrier comprising:
            a positive power plane comprising a first metal layer;
            a negative power plane comprising a second metal layer, wherein at least one of the first and second metal layers includes at least one fuse formed from the first metal layer or the second metal layer, respectively, for each of the plurality of battery cells coupled to the positive and negative power planes;
            a plurality of holes, the holes conducting a liquid coolant from a first position in contact with the positive power plane to a second position in contact with the negative power plane;
            a dielectric isolation layer disposed between the positive power plane and the negative power plane;
            a plurality of positive contacts formed in the positive power plane, each positive contact welded to a respective cathode terminal of a battery cell of the plurality of battery cells; and
            a plurality of negative contacts formed in the negative power plane, each negative contact welded to a respective anode terminal of a battery cell of the plurality of battery cells,
            wherein for each battery cell of the plurality of battery cells, at least one of the negative contact and the positive contact is coupled to one of the at least one fuse formed from the first metal layer or the second metal layer, respectively; and
         an enclosure having the battery cells and current carrier disposed therein, the enclosure including a power connector electrically coupled to the positive power plane and negative power plane;
      a main power connector electrically coupled to the power connectors of the two half modules; and
      a blast plate disposed substantially parallel to the current carrier such that the battery cells are disposed between the current carrier and the blast plate;

a tray having the plurality of modules disposed therein, the tray including:
a positive bus bar; and
a negative bus bar, the positive and negative bus bars being separately electrically coupled to the main power connectors of the plurality of modules; and
a coolant system for circulating liquid coolant being pumped into the tray such that each of the modules is at approximately the same predetermined temperature.

10. The vehicle energy-storage system of claim 9, wherein the first metal layer includes the at least one fuse formed in the positive power plane and electrically coupled to the respective positive contact of the plurality of positive contacts.

11. The vehicle energy-storage system of claim 9, wherein the current carrier further comprises:
a signal layer;
a second dielectric isolation layer disposed adjacent to the signal layer;
at least one sensor, each sensor of the at least one sensor being communicatively coupled to the signal layer and disposed adjacent to a respective battery cell of at least one of the plurality of battery cells; and
a communications connector communicatively coupled to the signal layer.

12. The vehicle energy-storage system of claim 9, wherein the current carrier further comprises:
the power connection electrically coupled separately to the positive power plane and the negative power plane.

13. The vehicle energy-storage system of claim 9, wherein each fuse is laser etched in the respective metal layer to dimensions corresponding to a type of low-resistance resistor.

14. The vehicle energy-storage system of claim 9, wherein each positive contact is laser or ultrasonically welded to the respective cathode terminal of the battery cell and each negative contact is laser or ultrasonically welded to the respective anode of the battery cell.

15. The vehicle energy-storage system of claim 9, wherein the current carrier comprises: a printed circuit board comprising at least one of copper, FR-2, FR-3, FR-4, FR-5, FR-6, G-10, CEM-1, CEM-2, CEM-3, CEM-4, and CEM-5.

16. The vehicle energy-storage system of claim 9, wherein the current carrier comprises: a flexible printed circuit comprising at least one of copper foil, polyester, polyimide, polyethylene naphthalate, polyetherimide, fluoropolymers, and copolymers.

17. The vehicle energy-storage system of claim 9, wherein the battery cells are cylindrical rechargeable lithium-ion cells.

18. A vehicle energy-storage system comprising:
a plurality of modules, each module comprising:
a plurality of battery cells, the battery cells being cylindrical rechargeable lithium-ion cells each having a first end and a second end, the first end distal from the second end, and having an anode terminal and a cathode terminal being disposed at the first end, the cells being oriented and mounted horizontally in each module;
a current carrier comprising:
a positive power plane comprising a first metal layer;
a negative power plane comprising a second metal layer, wherein at least one of the first and second metal layers includes at least one fuse formed from the first metal layer or the second metal layer, respectively, for each of a plurality of battery cells coupled to the positive and negative power planes;
a plurality of holes, the holes conducting a liquid coolant from a first position in contact with the positive power plane to a second position in contact with the negative power plane;
a dielectric isolation layer disposed between the positive power plane and the negative power plane;
a plurality of positive contacts formed in the positive power plane, each positive contact welded to a respective cathode terminal of a battery cell of the plurality of battery cells; and
a plurality of negative contacts formed in the negative power plane, each negative contact welded to a respective anode terminal of a battery cell of the plurality of battery cells,
wherein for each battery cell of the plurality of battery cells, at least one of the negative contact and the positive contact is coupled to one of the at least one fuse formed from the first metal layer or the second metal layer, respectively;
an enclosure having the battery cells and current carrier disposed therein, the enclosure including a power connector electrically coupled to the power connections;
a main power connector electrically coupled to the power connector; and
a blast plate disposed substantially parallel to the current carrier such that the battery cells are disposed between the current carrier and the blast plate;
a tray having the plurality of modules disposed therein, the tray including:
a positive bus bar; and
a negative bus bar, the positive and negative bus bars being separately electrically coupled to the main power connectors of the plurality of modules; and
a coolant system for circulating the liquid coolant being pumped into the tray such that each of the modules is at approximately the same predetermined temperature.

19. The current carrier of claim 1, wherein each fuse is laser etched in the respective metal layer to dimensions corresponding to a type of low-resistance resistor.

20. The vehicle energy-storage system of claim 9, further comprising:
a bracket disposed substantially parallel to the current carrier such that the bracket is disposed between the current carrier and the blast plate; and
a plurality of staking features securing the current carrier to the bracket, wherein one or more of the plurality of holes of the current carrier pass through one or more of the staking features.

\* \* \* \* \*